US010926748B2

(12) United States Patent
Besier et al.

(10) Patent No.: US 10,926,748 B2
(45) Date of Patent: Feb. 23, 2021

(54) BRAKING SYSTEM FOR A MOTOR VEHICLE

(71) Applicant: Continental Teves AG & Co. oHG, Frankfurt (DE)

(72) Inventors: Marco Besier, Bad Schwalbach (DE); Stefan Drumm, Saulheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 255 days.

(21) Appl. No.: 15/378,423

(22) Filed: Dec. 14, 2016

(65) Prior Publication Data

US 2019/0308596 A1    Oct. 10, 2019

Related U.S. Application Data

(63) Continuation of application No. PCT/EP2015/060832, filed on May 18, 2015.

(30) Foreign Application Priority Data

Jun. 30, 2014    (DE) ..................... 10 2014 212 608.8

(51) Int. Cl.
*B60T 13/58*    (2006.01)
*B60T 8/94*    (2006.01)
(Continued)

(52) U.S. Cl.
CPC ........ *B60T 8/94* (2013.01); *B60T 8/17* (2013.01); *B60T 8/321* (2013.01); *B60T 8/4077* (2013.01);
(Continued)

(58) Field of Classification Search
CPC .......... B60T 8/321; B60T 8/4081; B60T 7/22; B60T 13/686
(Continued)

(56) References Cited

U.S. PATENT DOCUMENTS 6,761,418 B2 *    7/2004   Nakamura  ............. B60T 8/321
                                                      303/113.1
7,837,278 B2 *   11/2010   Nilsson  .................. B60T 8/321
                                                      303/20
(Continued)

FOREIGN PATENT DOCUMENTS

CN        103029698 A       4/2013
CN        103079914 A       5/2013
(Continued)

OTHER PUBLICATIONS

International Search Report and Written Opinion dated Aug. 6, 2015 from corresponding International Patent Application No. PCT/EP2015/060832.

(Continued)

*Primary Examiner* — Christopher P Schwartz

(57) ABSTRACT

A braking system for a motor vehicle comprises a first and second electrically controllable pressure source for providing a brake pressure for actuating the wheel brakes. An electrically controllable pressure modulation device sets brake pressures that are individual to each of the wheel brakes, said device having electrically actuatable inlet valves and outlet valves for each wheel brake. The second pressure source comprises a motor-pump unit and at least one low-pressure accumulator. The low-pressure accumulator is connected to an output connection of at least one outlet valve. A first and a second energy supply unit for the braking system are independent from one another. The first energy supply unit supplies the first pressure source with energy. The second energy supply unit supplies the second pressure source with energy. The pressure modulation device is supplied with energy by the first energy supply unit and by the second energy supply unit.

19 Claims, 3 Drawing Sheets

(51) Int. Cl.
  *B60T 8/17* (2006.01)
  *B60T 8/32* (2006.01)
  *B60T 13/16* (2006.01)
  *B60T 13/68* (2006.01)
  *B60T 8/40* (2006.01)

(52) U.S. Cl.
  CPC .......... *B60T 8/4086* (2013.01); *B60T 13/161* (2013.01); *B60T 13/58* (2013.01); *B60T 13/686* (2013.01); *B60T 2240/00* (2013.01); *B60T 2250/00* (2013.01); *B60T 2270/10* (2013.01); *B60T 2270/30* (2013.01); *B60T 2270/402* (2013.01); *B60T 2270/413* (2013.01); *B60T 2270/82* (2013.01)

(58) Field of Classification Search
  USPC .......... 303/3, 15, 20, 122.15; 701/22, 70–72
  See application file for complete search history.

(56) References Cited

U.S. PATENT DOCUMENTS

| | | | | |
|---|---|---|---|---|
| 7,866,761 | B2 * | 1/2011 | Gerum | B60T 13/66 303/122.15 |
| 9,145,119 | B2 * | 9/2015 | Biller | B60T 8/4081 |
| 9,205,821 | B2 * | 12/2015 | Biller | B60T 8/4081 |
| 9,308,905 | B2 * | 4/2016 | Biller | B60T 8/4081 |
| 10,351,110 | B2 * | 7/2019 | Besier | B60T 7/22 |
| 2007/0222284 | A1 * | 9/2007 | Matsubara | B60T 13/586 303/122.04 |
| 2009/0079259 | A1 * | 3/2009 | Iwasaki | B60T 8/94 303/146 |
| 2010/0174430 | A1 * | 7/2010 | Irie | B60K 6/445 701/22 |
| 2012/0299367 | A1 * | 11/2012 | Ross | B60T 8/4872 303/3 |
| 2017/0129468 | A1 * | 5/2017 | Besier | B60T 8/4077 |

FOREIGN PATENT DOCUMENTS

| | | |
|---|---|---|
| CN | 103492247 A | 1/2014 |
| DE | 102008060029 A1 | 6/2010 |
| DE | 102011084206 A1 | 4/2012 |
| DE | 102012201535 A | 10/2012 |
| DE | 102012205860 A1 | 10/2012 |
| DE | 102012020421 A1 | 4/2014 |
| WO | 2012028521 A1 | 3/2012 |
| WO | 2012143175 A2 | 10/2012 |

OTHER PUBLICATIONS

German Search Report dated 11 Jun. 2015 for corresponding German Patent Application No. 10 2015 208 148.6.
Chinese Office Action dated Jun. 8, 2018 for corresponding Chinese Patent Application 201580034866.7.

* cited by examiner

BRAKING SYSTEM FOR A MOTOR VEHICLE

CROSS REFERENCE TO RELATED APPLICATIONS

This U.S. patent application claims the benefit of PCT patent application No. PCT/EP2015/060832, filed May 18, 2015, which claims the benefit of German patent applications No. 10 2014 212 608.8, filed Jun. 30, 2014 and 10 2015 208 148.3, filed May 4, 2015, all of which are hereby incorporated by reference.

TECHNICAL FIELD

The invention concerns a braking system for a motor vehicle.

BACKGROUND

In motor vehicle technology, "brake-by-wire" brake systems are becoming ever more widespread. Such brake systems often comprise, besides a master brake cylinder that can be operated by the driver of the vehicle, an electrically controllable pressure supply device, by means of which the hydraulic pressure for operating the wheel brakes is built up in the "brake-by-wire" operating mode. The presence of a "brake-by-wire" operating mode of the brake system is the prerequisite for automated driving, during which an electronic autopilot function steers, accelerates and brakes the vehicle either fully independently or in cooperation with the driver.

In order to meet the safety requirements for automated driving, in particular performing braking without operation of the brake pedal by the driver, even in the case of a failure of the electrically controllable pressure supply device, a second, independent device for the electrically controllable supply of brake pressure is necessary.

A brake system for motor vehicles with a first hydraulic unit with a brake pedal-operated master brake cylinder and a first electrically controllable pressure source and with a second hydraulic unit with a motor-pump assembly, low-pressure reservoirs and a wheel brake pressure modulation unit with an inlet valve and an outlet valve per wheel brake (so-called ESC hydraulic module (ESC: Electronic Stability Control) with closed ABS (ABS: Anti-lock Braking System)) is known from DE 10 2012 205 860 A1. two electronic control and regulating units are provided, whereby the first control and regulating unit is used for actuating the first hydraulic unit and the second control and regulating unit is used for actuating the second hydraulic unit. No statements are made regarding the supply of the components with electrical energy.

A brake system for motor vehicles is known from DE 10 2011 084 206 A1 with a master brake cylinder that can be electrically operated by an electrohydraulic actuator, a motor-pump assembly and a wheel brake pressure modulation unit with an inlet valve and an outlet valve per wheel brake. Two electronic control and regulating units are provided, whereby the first control and regulating unit is used for actuating the motor-pump assembly and the wheel brake pressure modulation unit and the second control and regulating unit is used for actuating the electrohydraulic actuator for operating the master brake cylinder. Furthermore, two separate power supplies are provided, whereby the first power supply supplies the first control and regulating unit with electrical energy and the second power supply supplies the second control and regulating unit with electrical energy. In the event of a failure of the first power supply, only a uniform build-up or reduction of brake pressure on all wheel brakes by the electrohydraulic actuator is still possible. The setting of wheel-specific brake pressures, in particular of an anti-lock brake control function or an electronic stability control (ESC) function or a different stabilizing assistance function of the brake system, is not possible in this case in the known brake system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore the object of the present invention to provide a brake system for a motor vehicle that meets the safety requirements of automated or autonomous driving. In doing so, in particular the availability of slip controlled and vehicle stabilizing braking shall be increased.

The invention is based on the idea of providing a brake system with a first electrically controllable pressure source for operating the wheel brakes, an electrically controllable pressure modulation device with an inlet valve and an outlet valve per wheel brake for setting wheel-specific brake pressures and a second electrically controllable pressure source for operating the wheel brakes comprising a motor-pump assembly with an at least dual circuit hydraulic pump and at least one low-pressure reservoir, which is connected to an output port of at least one outlet valve, a first electrical power supply unit and a second electrical power supply unit, which is independent of the first electrical power supply unit. In this case the first pressure source can be supplied with electrical energy by the first power supply unit, the second pressure source, i.e. at least the motor-pump assembly, can be supplied with electrical energy by the second power supply unit and the pressure modulation device can be supplied with electrical energy by the first power supply unit and the second power supply unit.

The invention is at least partly made to the known and proven hydraulic layout of a closed ABS with a motor-pump assembly and a low-pressure reservoir, and yet the safety requirements for automated driving are met. Such assemblies have been known for a long time and can produce high pressures and can be implemented with very compact dimensions.

Furthermore, the brake system has the a higher availability of the basic brake function, the slip control and the vehicle stabilization. It is also easily possible with the brake system to implement a fail-safe data path from an autopilot control unit to the brake system.

The low-pressure reservoir is used to accommodate the pressure medium that is discharged from the associated wheel brakes during ABS control (so-called closed ABS).

A suction port of the pump is preferably connected to the low-pressure reservoir by means of a non-return valve that opens towards the suction port, so that pressure medium can be sucked out of the low-pressure reservoir (recirculation principle).

The second pressure source preferably comprises at least one low-pressure reservoir that is connected to the output ports of the outlet valves of a brake circuit, i.e. a closed anti-lock braking system or an ABS with recirculation is associated with at least one of the brake circuits of the brake system.

The second pressure source preferably comprises a low-pressure reservoir per brake circuit, which is connected to the output ports of the outlet valves of the brake circuit.

The first pressure source can preferably be supplied with electrical energy exclusively by the first power supply unit and the second pressure source can preferably be supplied with electrical energy exclusively by the second power supply unit.

Compared to a brake system in which at least one of the two pressure sources can be supplied by the first and the second power supply units, this provides a smaller number of supply lines from the power supply units to the pressure sources.

According to a development of the invention, the brake system comprises a first electronic control and regulating unit for actuating the first pressure source that is associated with the first pressure source, a second electronic control and regulating unit for actuating the second pressure source that is associated with the second pressure source and a third electronic control and regulating unit for actuating the pressure modulation device that is associated with the pressure modulation device. Owing to the separately implemented third control and regulating unit for the pressure modulation device, increased availability can be achieved.

The pressure modulation device is preferably implemented as a standalone hydraulic unit. The pressure modulation device and the third electronic control and regulating unit are particularly preferably implemented as an electrohydraulic control unit.

The second pressure source with the motor-pump assembly and the low-pressure reservoir or low-pressure reservoirs, and possibly valves, is preferably implemented as a standalone hydraulic unit. Said hydraulic unit and the second electronic control and regulating unit are particularly preferably implemented as an electrohydraulic control unit.

According to an embodiment of the brake system, the first electronic control and regulating unit can be supplied with electrical energy by the first power supply unit, the second electronic control and regulating unit can be supplied with electrical energy by the second power supply unit and the third electronic control and regulating unit can be supplied with electrical energy by the first power supply unit and by the second power supply unit. Following a failure of the first or the second control and regulating unit, one of the pressure sources as well as the pressure modulation device can always still be supplied with electrical energy and actuated in order to thereby be able to perform safe braking.

The first and the second pressure sources and the pressure modulation device are preferably supplied with electrical energy by means of the electronic control and regulating unit associated therewith.

According to a development of the invention, the brake system comprises an electronic device for connecting the third electronic control and regulating unit to the first and the second power supply units. This is implemented such that a fault in one of the power supply units does not cause a failure of the power supply of the third electronic control and regulating unit. Particularly, the device comprises a DC-DC converter module with two input ports and one output port.

In order to be able to perform anti-lock braking control, the brake system has or is connected to wheel revolution rate sensors, whereby the signals of the wheel revolution rate sensors are delivered to the third control and regulating unit. The processing of the signals is carried out in the third control and regulating unit, so that the data required for actuating the pressure modulation device during wheel-specific brake pressure control are available even in the event of a failure of the first or second control and regulating unit.

Additionally, the brake system preferably has or is connected to a sensor device for detecting driving dynamics variables, whereby the signals of the sensor device are delivered to the third control and regulating unit that is associated with the pressure modulation device. The processing of the signals is particularly preferably carried out in the third control and regulating unit. This makes driving dynamic, wheel-specific brake pressure control possible, even in the event of a failure of the first or the second control and regulating unit.

The sensor device preferably comprises at least one sensor for detecting the yaw rate of the motor vehicle, at least one sensor for detecting the lateral acceleration of the motor vehicle and/or a sensor for detecting the longitudinal acceleration of the motor vehicle.

The first, the second and the third control and regulating units are preferably connected to each other by means of data busses.

The second pressure source comprises valves that can preferably be operated electrically. Said valves are actuated by the second electronic control and regulating unit as with the motor-pump assembly.

According to an embodiment of the brake system, the valves of the second pressure source are actuated by the third electronic control and regulating unit, whereas the motor-pump assembly of the second pressure source is actuated by the second electronic control and regulating unit.

The first electrically controllable pressure source has a master brake cylinder with a braking force booster, which is connected upstream thereof and that can be controlled both mechanically by means of a brake pedal and also electrically "by-wire", whereby the master brake cylinder comprises two pressure chambers (i.e. the master brake cylinder is implemented in a dual circuit form) and a brake circuit with wheel brakes is associated with each of the pressure chambers. Particularly, the electrically controllable braking force booster is connected upstream of the master brake cylinder. Such master brake cylinders with upstream connected, electrically controllable braking force boosters are already proven components of a brake system.

According to an embodiment of the brake system, for each brake circuit a suction port of the pump is reversibly connected to the associated pressure chamber of the master brake cylinder. Particularly, a normally closed valve is disposed in the connection. Furthermore, a pressure port of the pump is connected to the inlet valves of the wheel brakes of the brake circuit, being directly connected because of the lower flow resistance.

The braking force booster that can be controlled by the brake pedal or "by-wire" has an electrically controllable electromechanical actuator with an electric motor and a translation-rotation gearbox that operates a piston of the master brake cylinder.

The second pressure source is hydraulically disposed between the first pressure source and the pressure modulation device.

The second pressure source has a first normally open valve, a second normally closed valve and a low-pressure reservoir per brake circuit, whereby the outlet valves of the wheel brakes of the brake circuit are connected to the low-pressure reservoir. Particularly preferably, the second pressure source together with the pressure modulation device constitute the hydraulics of a known, conventional ESC unit. With known brake systems, the valves of the ESC control unit (inlet and outlet valves, isolating and switching valves) are disposed in a single hydraulic unit and are actuated by a single electronic control and regulating unit. Actuating the valves of the ESC control unit by two electronic control and regulating units (on the one hand inlet and outlet valves are actuated by the third electronic control and regulating unit, on the other hand isolating and switching valves are actuated by the second electronic control and regulating unit) results in a large increase in the availability of the brake system functions.

Alternatively, the second pressure source for only one of the brake circuits has a first normally open valve, a second normally closed valve and a low-pressure reservoir, whereby the outlet valves of the wheel brakes of said brake circuit are connected to the low-pressure reservoir. For the other brake circuit, the second pressure source comprises no low-pressure reservoir. The outlet valves of the wheel brakes of the other brake circuit are connected to a pressure medium reservoir container at atmospheric pressure. The pressure medium reservoir container is associated with the master brake cylinder. Particularly, the second pressure source comprises a first normally open valve and a second normally open valve for the other brake circuit.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
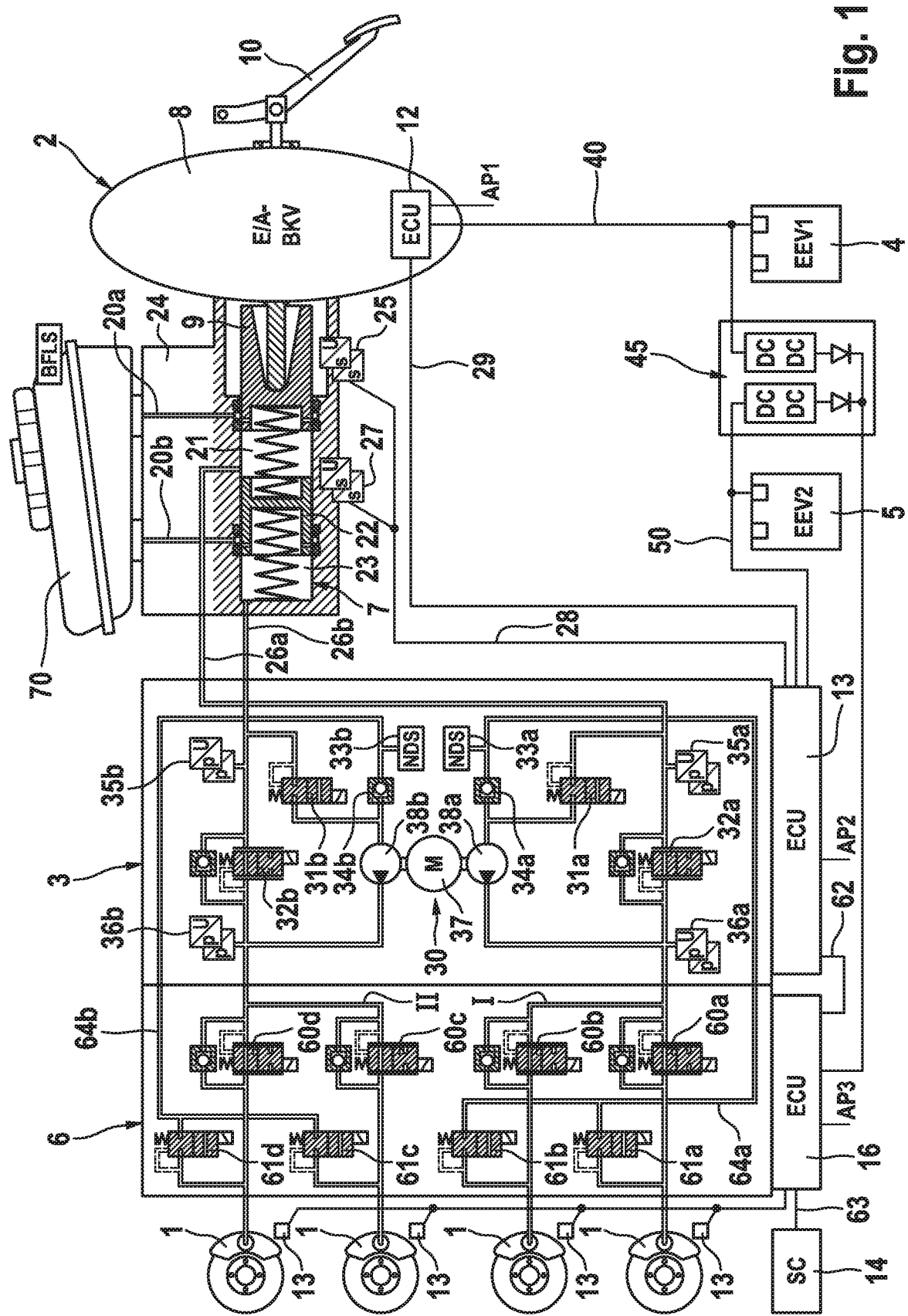
FIG. 1 shows a first exemplary embodiment of a brake system according to the invention.

The brake system according to the example and according to FIG. 1 essentially comprises a first electrically controllable pressure source 2 for supplying a brake pressure for operating the wheel brakes 1 of a motor vehicle that is not shown, a second electrically controllable pressure source 3 for supplying a brake pressure for operating the wheel brakes 1, an electrically controllable pressure modulation device 6 for setting wheel-specific brake pressures for the wheel brakes 1, first, second and third electronic control and regulating units (ECU: electronic control unit) 12, 13, 16 as well as a first electrical power supply unit 4 and a second electrical power supply unit 5 that is independent of the first electrical power supply unit.

The first electronic control and regulating unit 12 is associated with the first pressure source 2 and is used for actuating the first pressure source 2. The second electronic control and regulating unit 13 is associated with the second pressure source 3 and is used for actuating the second pressure source 3 and the third electronic control and regulating unit 16 is associated with the pressure modulation device 6 and is used for actuating the pressure modulation device 6.

The first electrically controllable pressure source 2 comprises a dual circuit master brake cylinder 7 with two pistons 9, 22 disposed one after the other that bound two hydraulic pressure chambers 21, 23. The pressure chambers 21, 23 are connected on the one hand to a pressure medium reservoir container 70 at atmospheric pressure by means of radial bores formed in the pistons 9, 22 as well as corresponding pressure equalization lines 20a, 20b, whereby said connections can be shut off by a relative displacement of the pistons 9, 22 in the housing 24. On the other hand, each of the pressure chambers 21 or 23 is connected to the second pressure source 3 by means of a hydraulic connection 26a or 26b. The pressure chambers 21, 23 accommodate restoring springs that are not identified in detail and that position the pistons 9, 22 in an initial position when the master brake cylinder 7 is not being operated.

Furthermore, the first controllable pressure source 2 comprises an electrically controllable braking force booster 8 that is connected upstream of the master brake cylinder 7.

Operating the brake pedal 10 of the brake system is detected for example by means of a travel sensor or an angle sensor that is not shown, for example in the braking force booster 8, and the sensor signal is passed on to the first electronic control and regulating unit 12 that is associated with the first pressure source 2.

Between the first and the second control and regulating units 12, 13 there is advantageously a data line, for example a data bus, 29, by means of which the first control and regulating unit 12 can transmit a condition status of the first pressure source to the second control and regulating unit 13. For example, the first control and regulating unit 12 can transmit a fault message to the second control and regulating unit 13 in the event of a fault in the first pressure source 2. Alternatively or additionally, the first control and regulating unit 12 can transmit an "in order" signal to the second control and regulating unit 13 if the first pressure source is operational. In both cases, using the transmitted condition status of the first pressure source, the second control and regulating unit 13 can detect whether the second pressure source 3 should be actuated for operating the wheel brakes.

Owing to the hydraulic series connection of the two pressure sources 2, 3, whereby the pressure of the first pressure source is passed through the second pressure source when the second pressure source is de-energized (basic state), a build-up of the pressures on the pressure modulation device 6 (so-called modulator inlet pressures) is then guaranteed even if the first pressure source is not operationally ready, for example as a result of a failure of the first electrical power supply, and in addition the first control and regulating unit 12 does not send a corresponding fault signal. For this case, for the independent operation of the wheel brakes and suitable actuation of the second pressure source 3 advantageously two further, independent travel sensors 25 and 27 are provided, which for example detect a displacement of the pistons 9 and 22, and the signals thereof are transmitted to the second electronic control and regulating unit 13 by means of a signal or data line 28.

The pressure modulation device 6 is implemented as a standalone hydraulic unit and comprises 1 an inlet valve 60a-60d and an outlet valve 61a-61d for each wheel brake, which are connected together hydraulically in pairs by means of center ports and are connected to the wheel brake 1. The input ports of the inlet valves 60a-60d are supplied with a pressure for each brake circuit I, II (modulator inlet pressure) by the second pressure source 3. A non-return valve that is not referred to in detail and that opens towards the second pressure source 3 is connected in parallel with each of the inlet valves 60a-60d. The output ports of the outlet valves 61a, 61b; 61c, 61d are connected to a low-pressure reservoir 33a, 33b of the second pressure source 3 I; II by means of the associated return line 64a, 64b for each brake circuit.

The third electronic control and regulating unit 16 that is associated with the pressure modulation device 6 is connected to the second electronic control and regulating unit 13 by means of a data line, for example a data bus, 62. The third control and regulating unit 16 can thus request an additional pressure build-up (for example for the ESC function) from the second control and regulating unit 13.

The hydraulic unit 6 and the electronic unit are preferably implemented as an electrohydraulic control unit (HECU).

According to the example, the second electrically controllable pressure source 3 is implemented as a standalone hydraulic unit that is hydraulically disposed between the first pressure source 2 and the pressure modulation device 6.

The hydraulic unit 3 and the electronic unit are preferably implemented as an electrohydraulic control unit (HECU).

According to the example, the pressure source essentially comprises an electrically controllable pressure supply device 30, which is implemented as a dual circuit motor-pump assembly, the low-pressure reservoir 33a, 33b for each brake circuit or for each hydraulic line 26a or 26b and valves 31a, 32a, 31b, 32b that can be electrically operated.

The motor-pump assembly 30 comprises two pumps 38a, 38b that are commonly driven by an electric motor 37. The motor-pump assembly is of the type of piston pump that is driven by the electric motor by means of a cam, a design that is already used in the millions as a return pump in known brake systems. This can produce particularly high system pressures and can be implemented in a very compact size.

According to the example, two valves 31a, 32a or 31b, 32b that can be electrically operated as well as two pressure sensors 35a, 36a or 35b, 36b are provided for each brake circuit I, II.

A normally open, analog-actuated valve 32a, 32b, by means of which the hydraulic connection between the master brake cylinder pressure chamber 21, 23 and the pressure modulation device 6 can be interrupted, is disposed in each of the connections 26a, 26b to the pressure modulation device 6.

A non-return valve that that is not identified in detail and that opens towards the pressure modulation device 6 is connected in parallel with each valve 32a, 32b.

The pressure upstream and downstream of the valve 32a, 32b is measured by means of the pressure sensors 35a, 36a or 35b, 36b.

In each brake circuit, the suction port of the pump 38a, 38b is connected to the low-pressure reservoir 33a, 33b by means of a non-return valve 34a, 34b that opens towards the suction port, so that pressure medium can be sucked out of the low-pressure reservoir 33a, 33b.

The respective pressure port of the pump 38a, 38b is connected to the associated input port of the pressure modulation device 6 or the input ports of the associated inlet valves 60a, 60b, 60c, 60d.

Furthermore, the suction port of the pump 38a, 38b is connected in each case to the region of the connection 26a, 26b on the master brake cylinder pressure chamber side by means of a hydraulic connection, whereby a normally closed valve 31a, 31b is provided in the hydraulic connection.

According to the example, the overall hydraulics of the pressure modulation device 6 and the pressure source 3 constitute the hydraulics of a known conventional ESC unit (ESC: Electronic Stability Control) or of a known closed ABS.

The first pressure source 2 is supplied with electrical energy by means of a supply line 40 from the first power supply unit 4 and the second pressure source 3 is supplied with electrical energy by means of a supply line 50 from the second power supply unit 5.

An electronic device 45 is provided for supplying the pressure modulation device 6 with electrical energy, using which the pressure modulation device 6 can be supplied by the first power supply unit 4, by the second power supply unit 5 or by both power supply units. This can for example be a switchable current supply or voltage supply, so that the pressure modulation device 6 is selectively supplied by the first power supply unit 4 or the second power supply unit 5. The device 45 is implemented in such a way that a fault in one of the power supply units, for example 4, cannot result in a failure of the other power supply unit, for example 5, that is caused by the device 45, so that the power supply of the third electronic control and regulating unit 16 would fail completely. According to the example the device 45 comprises a DC-DC converter module with two input ports and one output port.

In order to be able to perform anti-lock brake control, the brake system according to the example comprises a wheel revolution rate sensor 13 per wheel of the motor vehicle. In order that the signals of the wheel revolution rate sensors 13 are available for anti-lock brake control even in the event of a failure of one of the power supply units 4, 5 or in the event of a failure of one of the control and regulating units 12, 13, the signals of the wheel revolution rate sensors 13 are delivered to the control and regulating unit 16 of the pressure modulation device 6. According to the example, the wheel revolution rate signals are processed and analyzed in the control and regulating unit 16. The wheel revolution rate sensors 13 are advantageously supplied with electrical energy by the control and regulating unit 16.

In order to be able to perform driving dynamics control or a stabilizing assistance function, the brake system according to the example further has a sensor device 14 (SC: Sensor Cluster) for detecting driving dynamics variables, the signals of which are delivered to the control and regulating unit 16 of the pressure modulation device 6 by means of a signal line or data line 63, implemented for the same reasons as above, and are also processed and analyzed there. The sensor device 14 is advantageously supplied with electrical energy by the control and regulating unit 16.

The sensor device 14 according to the example has a sensor for detecting the yaw rate of the motor vehicle and a sensor for detecting the lateral acceleration of the motor vehicle. The sensor device also includes a sensor for detecting the longitudinal acceleration of the motor vehicle. Full detection of the inertial motion data of the vehicle structure is achieved with the use of a sensor module that detects the accelerations and angular rates thereof in each of three spatial directions. Furthermore, the sensor device 14 preferably comprises a steering angle sensor or a steering wheel angle sensor.

Each of the three electronic control and regulating units 12, 13 and 16 is connected to a control unit or a computer network with an autopilot function by means of a data bus connection AP1, AP2, AP3 that is independent of the others. Particularly safe triple redundancy is thus possible for autonomous driving.

Figure 2:
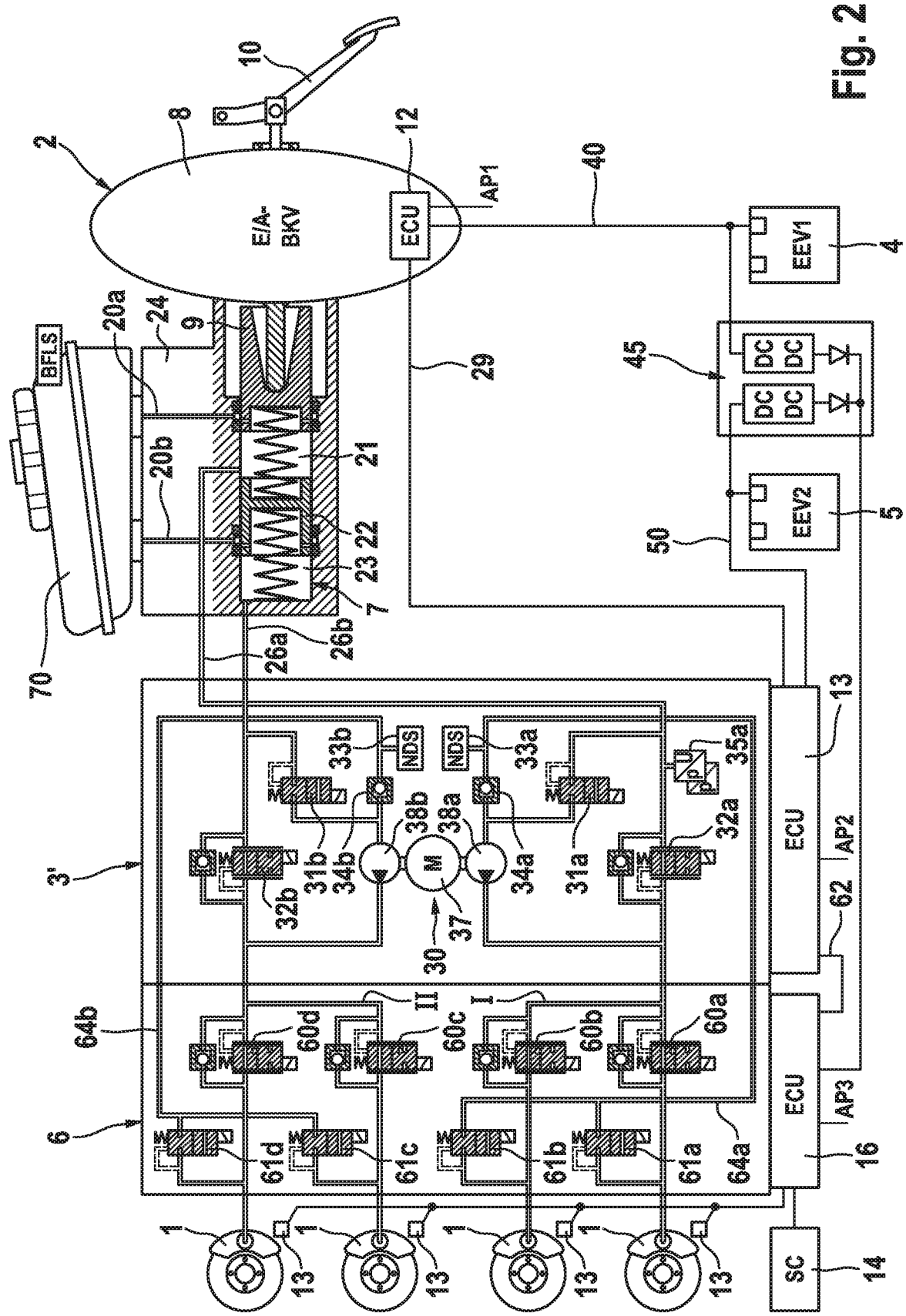
FIG. 2 shows a second exemplary embodiment of a brake system according to the invention.

In FIG. 2 a second exemplary embodiment of a brake system is illustrated schematically. The brake system differs from the first exemplary embodiment illustrated in FIG. 1 essentially in that only the pressure sensor 35a is provided in the second pressure source 3'. The pressure sensor 35a detects the pressure of the first master brake cylinder pressure chamber 21 or the pressure upstream of the valve 32a. The remaining remarks made above for the first exemplary embodiment apply accordingly to the second exemplary embodiment.

Figure 3:
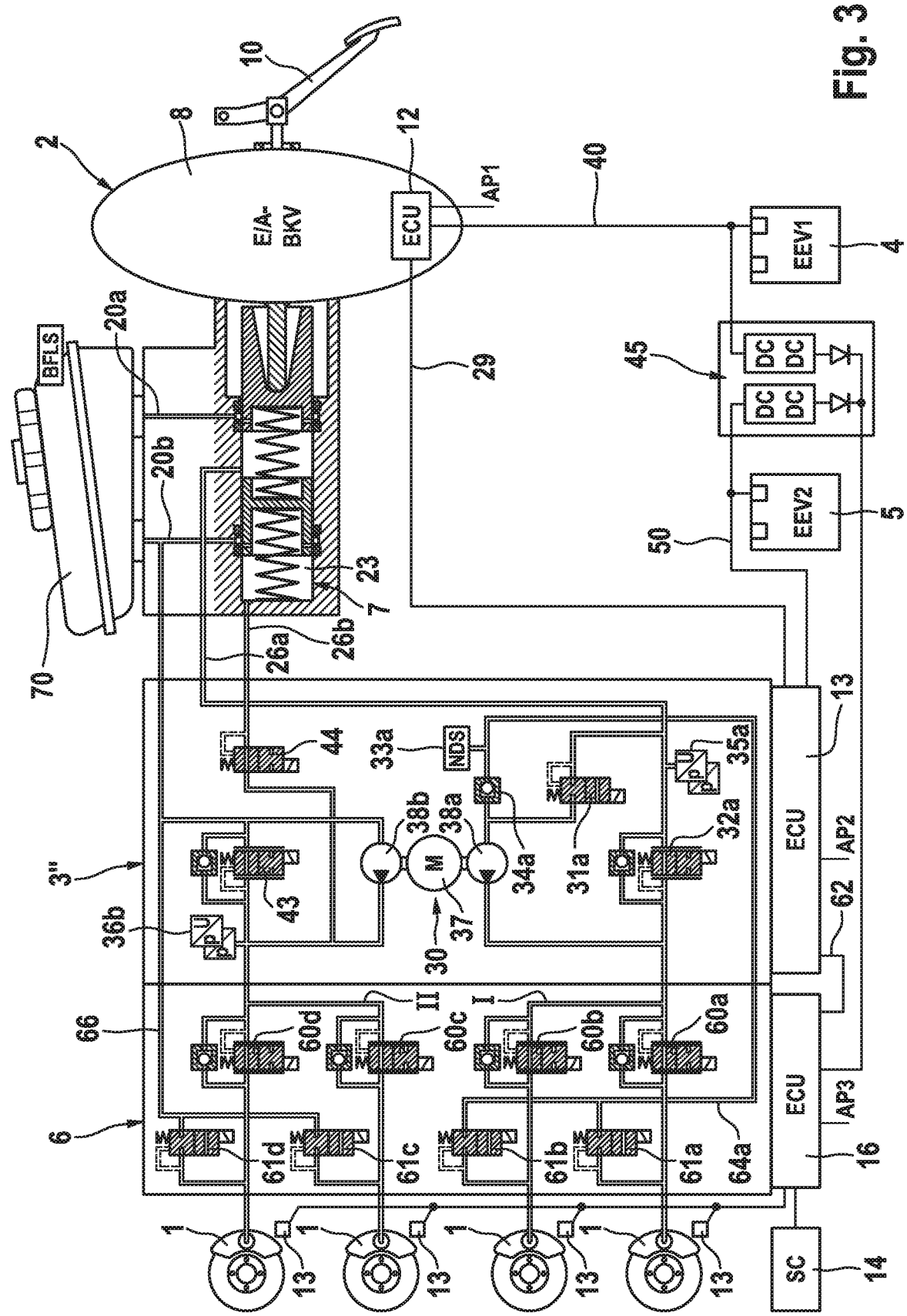
FIG. 3 shows a third exemplary embodiment of a brake system according to the invention

In FIG. 3 a third exemplary embodiment of a brake system is illustrated schematically. The brake system differs from the second exemplary embodiment essentially by the implementation of the second pressure source 3". The pressure source 3" also comprises a dual circuit motor-pump assembly 30. Regarding the brake circuit I, the second pressure source 3" is implemented as in the second exemplary embodiment (closed ABS with a low-pressure reservoir 33a).

Regarding the brake circuit II, it is an open ABS, i.e. no low-pressure reservoir 33b is provided. The outlet valves 61c and 61d are connected to the pressure medium reservoir container 70 by means of a return line 66. Accordingly, the suction port of the pump 38b is connected to the return line 66, and thereby to the pressure medium reservoir container 70, so that the pressure medium is sucked out of the pressure medium reservoir container 70 by the pump 38b.

According to the example, for brake circuit II two normally open valves 43 and 44 that can be operated electrically as well as a pressure sensor 36b are provided in the pressure source 3".

The normally open valve 44, by means of which the hydraulic connection between the master brake cylinder pressure chamber 23 and the pressure modulation device 6 can be interrupted, is disposed in the connection 26b between the pressure chamber 23 of the master brake cylinder 7 and the pressure modulation device 6.

The pump 38b is connected in parallel with the normally open, advantageously analog-actuated valve 43. The valve 43 is connected in parallel with a non-return valve that opens towards the pressure modulation device 6 and that is not identified in detail.

The pressure downstream of the valve 43, i.e. the modulator inlet pressure of the brake circuit II, is measured by means of the pressure sensor 36b.

The availability of slip-controlled and vehicle stabilizing braking is increased by the brake system, in particular also because the availability of the full functional range of known brake systems is at risk mainly from faults in the electrical power supply and in the electronic control and regulating unit. By contrast, faults in the hydraulics are rather rare.

It is preferably therefore proposed to adopt the proven hydraulic layout of a known "ESC brake system" (see FIG. 1), but to change the power supply and the electronic configuration.

The brake system is supplied by two mutually independent electrical power supply units 4, 5 and comprises three electronic control and regulating units 12, 13, 16.

The first control and regulating unit 12 is preferably connected to the first electrical power supply unit 4 and controls the first pressure source 2, in particular the braking force booster 8.

The second control and regulating unit 13 is connected to the second electrical power supply unit 5 and controls the second pressure source 3, 3', 3", in particular the circuit pressure supply of the ESC hydraulics (modulator inlet pressures), by actuating pumps 38a, 38b and valves 31a, 32a, 31b, 32b or 31a, 32a, 43, 44.

The third control and regulating unit 16 is connected to the first and the second electrical power supply units 4, 5 and controls the wheel brake pressure modulation by actuating the wheel brake pressure modulation valves 60a-60d, 61a-61d.

For connecting the third control and regulating unit 16 to the two electrical power supply units 4, 5, an electronic device 45 is provided that is designed so that a fault in the one power supply unit cannot result in a failure of the other power supply unit caused by said device 45.

For example, said electronic device 45 consists of a DC-DC converter module with two inputs and one output.

In addition, undervoltages and overvoltages can be compensated to a certain extent. In this respect no high current load, such as an electrically driven pump or a braking force booster, is connected to the third control and regulating unit 16, but only eight valves 60a-60d, 61a-61d with a relatively low power requirement.

The third control and regulating unit 16 is responsible for all brake system-specific control tasks that deviate from a central pressure position—for example locking prevention and vehicle stabilization. Accordingly, the sensors required for this, such as for example wheel revolution rate sensors 13, inertial sensor systems 14 and steering angle sensors, are preferably connected to the third control and regulating unit 16.

The first control and regulating unit 12 is preferably a component of the "first pressure source" brake subsystem 2, in particular of the braking force booster 8. The control and regulating unit 12 is advantageously disposed near the braking force booster actuator system and controls the braking force boosting or the pressure supply by means of the braking force booster.

The first control and regulating unit 12 is preferably connected to the second control and regulating unit 13 and the third control and regulating unit 16 by means of a data bus (according to the example data busses 29, 62) and can thus for example be requested by the third control and regulating unit 16 to actively build up a brake pressure.

The second control and regulating unit 13 controls the second pressure source 3, 3', 3", in particular the pump motor 37 and the valves 31a, 32a, 31b, 32b or 31a, 32a, 43, 44 (for example the valves 31a, 32a, 31b, 32b, which are part of the ESC hydraulic unit). Therefore, the second control and regulating unit 13 is structurally connected to the second pressure source.

The second control and regulating unit 13 is connected to the first control and regulating unit 12 and the third control and regulating unit 16 by means of a data bus (29, 62) and can thus for example be requested by the third control and regulating unit to actively build up a brake pressure. Moreover, it is possible for the first control and regulating unit 12 to request the second control and regulating unit 13 to build up modulator inlet pressures.

According to an, the actuation of the electromagnetic valves 31a, 32a, 31b, 32b or 31a, 32a, 43, 44 of the second pressure source 3, 3', 3" is also carried out by the third control and regulating unit 16. In this case, the tasks of the second control and regulating unit 13 are reduced to the control of the electrical pump motor 37. However, the range of functions of such a system in the event of the occurrence of potential faults is smaller than in the other embodiment, in which the actuation of the electromagnetic valves 31a, 32*a*, 31*b*, 32*b* or 31*a*, 32*a*, 43, 44 of the second pressure source 3, 3', 3" is carried out by the second control and regulating unit 13.

The function of the third control and regulating unit 16 has a decisive influence on the availability of the brake system control functions. In the case in which the third control and regulating unit 16 shuts itself down because of an internal fault or because of a failure of the dual supplied power supply thereof, said control functions fail. In this case, both the driver and also the autopilot function of the vehicle can still brake by means of a redundant electronic system—but just without wheel-specific control actions. The driver gets a braking force boost in this case—either by the first pressure source 2 (for example the normal braking force booster) or by means of the second pressure source 3, 3', 3" (i.e. the pump-valve-hydraulics) that is controlled by the second control and regulating unit 13.

The brake systems according to the examples are suitable for use in autonomously driving vehicles. On the one hand the brake system has the higher availability of the basic brake function, slip control and vehicle stabilization, and on the other hand it is possible to make the data path from the autopilot computer to the brake system fail-safe.

Because there are at least three control and regulating units 12, 13, 16 in the brake system, the data can be exchanged redundantly. Even the particularly safe triple redundancy is possible by each of the three control and regulating units receiving data from the computer network of the autopilot function with a data bus connection that is independent of the others.

If the first power supply unit 4 (or the first control and regulating unit 12) fails, this affects the first pressure source 2, for example the braking force booster 8. The functionality thereof is replaced by a modulator inlet pressure supply by means of the second pressure source 3, 3', 3", which is supplied by the second power supply unit 5 (and controlled by the second control and regulating unit 13). The brake system then has full functionality.

If the second power supply unit 5 (or the second control and regulating units 13) fails, this affects the second pressure source 3, 3', 3", in particular the pressure build-up by means of the pump 38*a*, 38*b* and the recirculation, i.e. pumping the low-pressure reservoir(s) 33*a*, 33*b* empty. In this case, the pressure build-up is performed by the first pressure source 2 that is supplied by the first power supply unit 4 (and controlled by the first control and regulating unit 12), for example the braking force booster 8, and the brake system has full functionality as long as the low-pressure reservoir(s) is/are not completely full.

If the third control and regulating unit 16 fails, both the braking force boosting function and also the "brake-by-wire" function are always still redundantly available. Therefore, the driver can also still safely brake strongly in this case and the autopilot (the autopilot function) can also decelerate the vehicle "by-wire". In additional, one of the two power supply units 4, 5 can even fail without said braking function being lost.

A brake system with an electrically controllable braking force booster with an ESC hydraulic module connected downstream is proposed. The known hydraulic layout is not changed, but the known ESC control and regulating unit is replaced by two control and regulating units 13, 16, which accordingly have to actuate fewer components. Said changes result in a large increase in the availability of the brake system functions.

If a vehicle is to be provided that is to be supplied both without and also with automated driving functions, then all vehicles can simply be equipped with a brake system. The extra cost for conventional vehicles is low and at the same time a brake system with high operating reliability for automated driving can be provided if required.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A hydraulic brake system for a motor vehicle comprising:
    a first electrically controllable pressure source which supplies a brake pressure for operating wheel brakes;
    an electrically controllable pressure modulation device for setting wheel-specific brake pressures for the wheel brakes with an inlet valve that can be operated electrically and an outlet valve that can be operated electrically for each wheel brake;
    a second electrically controllable pressure source for supplying a brake pressure for operating the wheel brakes comprising a motor-pump assembly with an at least dual circuit hydraulic pump and at least one low-pressure reservoir, whereby the low-pressure reservoir is connected to an output port of at least one outlet valve;
    a first electrical power supply unit and a second electrical power supply unit that is independent of the first electrical power supply unit; and
    whereby the first pressure source is exclusively supplied with electrical energy by the first power supply unit, the second pressure source is exclusively supplied with electrical energy by the second power supply unit, and the pressure modulation device is supplied with electrical energy by the first power supply unit or the second power supply unit or by both the first power supply and the second power supply.

2. The brake system of claim 1, wherein a first electronic control and regulating unit associated which actuates the first pressure source, a second electronic control and regulating unit which actuates the second pressure source and a third electronic control and regulating unit which actuates the pressure modulation device are provided.

3. The brake system of claim 2, wherein the first electronic control and regulating unit can be supplied with electrical energy by the first power supply unit, the second electronic control and regulating unit can be supplied with electrical energy by the second power supply unit and the third electronic control and regulating unit can be supplied with electrical energy by the first power supply unit and by the second power supply unit.

4. The brake system of claim 3, further comprising an electronic device connecting the third electronic control and regulating unit to the first and the second power supply units, wherein a fault in one of the power supply units results in a failure of the power supply of the third electronic control and regulating unit.

5. The brake system of claim 2, wherein the first, the second and the third electronic control and regulating units are connected to each other by at least one data bus.

6. The brake system of claim 2, wherein the third electronic control and regulating unit receives signals from wheel revolution rate sensor and from a sensor device for detecting driving dynamics variables.

7. The brake system of claim 1, further comprising valves of the second pressure source that can be operated electrically.

8. The brake system of claim 7, wherein the valves of and the motor-pump assembly of the second pressure source are actuated by the second electronic control and regulating unit.

9. The brake system of claim 7, wherein the valves of the second pressure source are actuated by a third electronic control and regulating unit, and the motor-pump assembly of the second pressure source is actuated by the second electronic control and regulating unit.

10. The brake system of claim 1, further comprising a master brake cylinder with a braking force booster for the first electrically controllable pressure source, wherein the master brake cylinder is connected upstream thereof and can be controlled both mechanically by a brake pedal and electrically, wherein the master brake cylinder defines two pressure chambers and a brake circuit with wheel brakes is associated with each of the pressure chambers.

11. The brake system of claim 10, wherein for each brake circuit a suction port of the pump is reversibly connected to the associated pressure chamber of the master brake cylinder by a normally closed valve, and a pressure port of the pump is connected directly to the inlet valves of the wheel brakes of the brake circuit.

12. The brake system of claim 10, wherein the braking force booster further comprises an electrically controllable electromechanical actuator, which is an electric motor and a translation-rotation gearbox that operates a piston of the master brake cylinder.

13. The brake system of claim 10, wherein the second pressure source further comprises a first normally open valve, a second normally closed valve and a low-pressure reservoir for each brake circuit, whereby the outlet valves of the wheel brakes of the brake circuit are connected to the low-pressure reservoir.

14. The brake system of claim 10, wherein for one of the brake circuits the second pressure source comprises a first normally open valve, a second normally closed valve and the low-pressure reservoir, whereby the outlet valves of the wheel brakes of said brake circuit are connected to the low-pressure reservoir, and the outlet valves of the wheel brakes of the other brake circuit are connected to a pressure medium reservoir container that is at atmospheric pressure and associated with the first pressure source.

15. A hydraulic brake system for a motor vehicle comprising:
a first electrically controllable pressure source which supplies a brake pressure for operating wheel brakes;
an electrically controllable pressure modulation device for setting wheel-specific brake pressures for the wheel brakes with an inlet valve that can be operated electrically and an outlet valve that can be operated electrically for each wheel brake;
a second electrically controllable pressure source for supplying a brake pressure for operating the wheel brakes comprising a motor-pump assembly with an at least dual circuit hydraulic pump and at least one low-pressure reservoir, whereby the low-pressure reservoir is connected to an output port of at least one outlet valve;
a first electrical power supply unit and a second electrical power supply unit that is independent of the first electrical power supply unit, whereby the first pressure source can be supplied with electrical energy by the first power supply unit, the second pressure source can be supplied with electrical energy by the second power supply unit and the pressure modulation device can be supplied with electrical energy by the first power supply unit and the second power supply unit; and
a first electronic control and regulating unit associated which actuates the first pressure source, a second electronic control and regulating unit which actuates the second pressure source and a third electronic control and regulating unit which actuates the pressure modulation device are provided.

16. The brake system of claim 15, wherein the first electronic control and regulating unit can be supplied with electrical energy by the first power supply unit, the second electronic control and regulating unit can be supplied with electrical energy by the second power supply unit and the third electronic control and regulating unit can be supplied with electrical energy by the first power supply unit and by the second power supply unit.

17. The brake system of claim 16, further comprising an electronic device connecting the third electronic control and regulating unit to the first and the second power supply units, wherein a fault in one of the power supply units results in a failure of the power supply of the third electronic control and regulating unit.

18. The brake system of claim 15, wherein the first, the second and the third electronic control and regulating units are connected to each other by at least one data bus.

19. The brake system of claim 15, wherein the third electronic control and regulating unit receives signals from wheel revolution rate sensor and from a sensor device for detecting driving dynamics variables.

* * * * *